US010084543B2

(12) United States Patent
Won

(10) Patent No.: US 10,084,543 B2
(45) Date of Patent: Sep. 25, 2018

(54) ANALOG OPTICAL REPEATER AND SINGLE OPTICAL LINE TRANSMITTING METHOD FOR MULTI-BAND MULTIPLE-INPUT MULTIPLE-OUTPUT (MIMO)

(71) Applicant: ADVANCED RF TECHNOLOGIES, INC., Burbank, CA (US)

(72) Inventor: Jung-Hee Won, Anyang-si (KR)

(73) Assignee: Advanced RF Technologies, Inc., Burbank, CA (US)

( * ) Notice: Subject to any disclaimer, the term of this patent is extended or adjusted under 35 U.S.C. 154(b) by 0 days.

(21) Appl. No.: 15/395,280

(22) Filed: Dec. 30, 2016

(65) Prior Publication Data

US 2018/0191440 A1 Jul. 5, 2018

(51) Int. Cl.
*H04B 10/00* (2013.01)
*H04B 10/29* (2013.01)
*H04B 7/0413* (2017.01)

(52) U.S. Cl.
CPC .......... *H04B 10/29* (2013.01); *H04B 7/0413* (2013.01)

(58) Field of Classification Search
CPC .......... H04B 10/25754; H04B 10/0795; H04B 10/506; H04B 10/271; H04W 88/085; H04W 4/02; H04J 14/02; H04Q 11/0005

USPC .......................................... 398/175; 375/211
See application file for complete search history.

(56) References Cited

U.S. PATENT DOCUMENTS

| | | | | | |
|---|---|---|---|---|---|
| 2010/0284446 | A1* | 11/2010 | Mu | ..................... | H04B 7/15521 375/211 |
| 2012/0257659 | A1* | 10/2012 | Braz | ................... | H04W 88/085 375/222 |
| 2016/0285617 | A1* | 9/2016 | Van der Goes | ....... | H04L 7/0331 |

* cited by examiner

*Primary Examiner* — Don N Vo
(74) *Attorney, Agent, or Firm* — Lewis Roca Rothgerber Christie LLP

(57) ABSTRACT

A multi-band multiple-input multiple-output (MIMO) transmitting apparatus and method of using an analog optical repeater that relays a downstream signal and an upstream signal between a base station and a terminal is provided. A head end of the analog optical repeater converts a frequency of a signal through a frequency converter to prevent the signal from overlapping with other signals having the same frequencies of a downstream multi-band, and uses a band already used by an optical module, and thus does not need to secure an additional band in the optical module. Accordingly, signals at the same frequency input into the HE can be transmitted through the optical cable and to the RU without overlapping. A flow of upstream signals received from the terminal are handled and transmitted similarly to the downstream signals, but in the opposite direction, whereby multi-band MIMO is implemented.

18 Claims, 8 Drawing Sheets

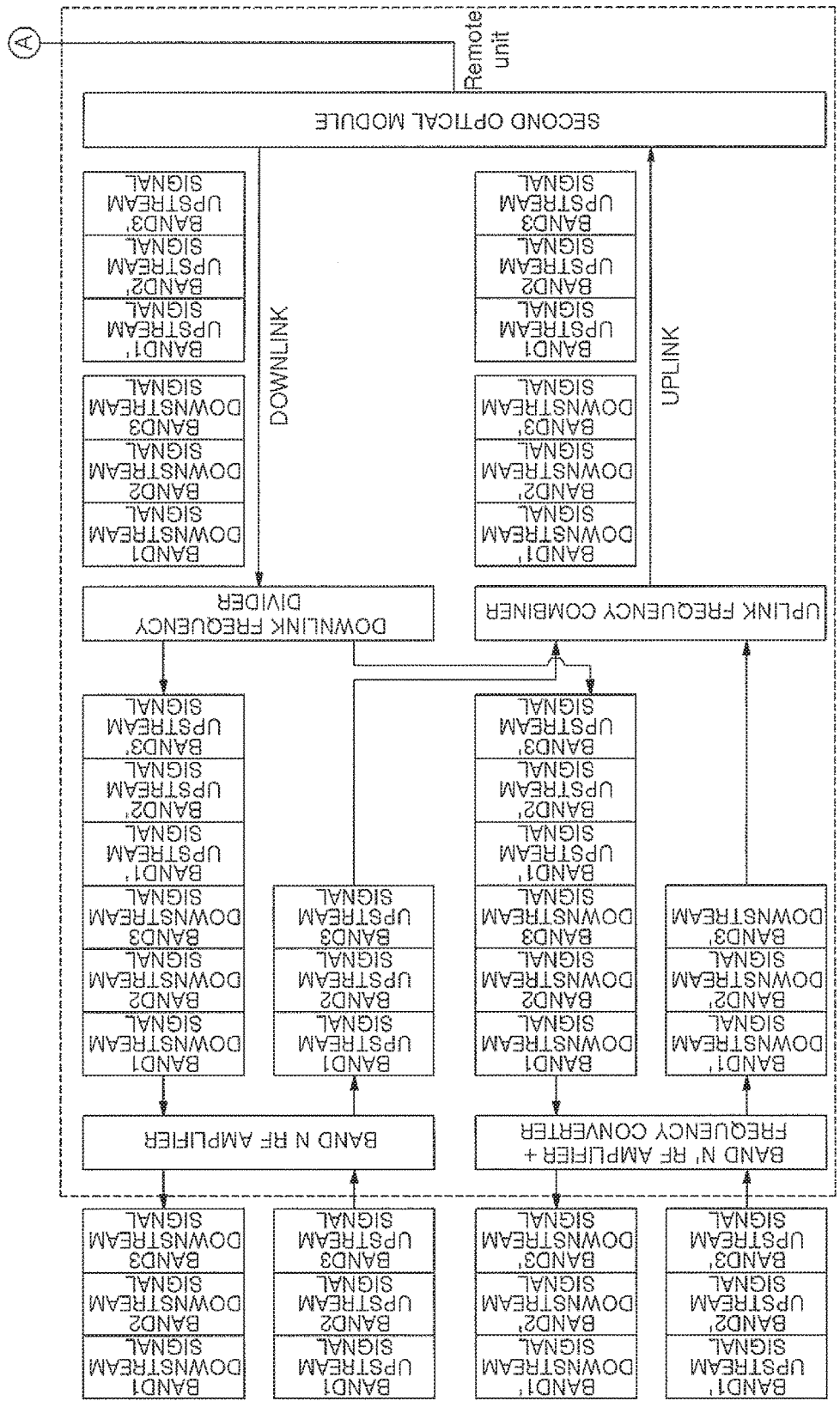

ANALOG OPTICAL REPEATER AND SINGLE OPTICAL LINE TRANSMITTING METHOD FOR MULTI-BAND MULTIPLE-INPUT MULTIPLE-OUTPUT (MIMO)

BACKGROUND

Field

Embodiments of the invention relate generally to signal transmitting devices and methods associated with analog optical repeater systems to be used in mobile communication, and more particularly, aspects of the invention relate to the development of mobile communication service technology, where a mobile communication provider can secure multi-band mobile communication frequencies, and can employ multiple-input multiple-output (MIMO) to improve data transmission rates.

Description of Related Art

FIG. 1 illustrates a system of a general analog optical repeater.

A general analog optical repeater includes a head end (HE) and a remote unit (RU). Referring to FIG. 1, an analog optical repeater 10 is disposed between a base station 20 and a terminal 30. The analog optical repeater 10 relays a downstream signal of the base station 20 to the terminal 30, and an upstream signal of the terminal 30 to the base station 20, thereby covering shadow areas and extending coverage.

In general, the analog optical repeater 10 includes an HE 11 and an RU 12, and the HE 11 and the RU 12 are connected to each other through an optical cable 13. The base station 20 transmits a signal to the HE 11 using a radio frequency (RF) cable.

The HE 11 converts an RF signal received from the base station 20 into an analog optical signal, and transmits the analog optical signal to the RU 12 through the optical cable 13. The RU 12 inversely converts the received analog optical signal into an RF signal and transmits the RF signal to the terminal 30 through an amplifier and an antenna, thereby providing a communication service.

In response to a service request from the terminal 30 to the base station 20, the foregoing process is performed in reverse.

The analog optical repeater 10 can also be used to provide multi-band service.

Thus, the analog optical repeater 10 is also referred to as a multi-band analog optical repeater or a multi-band optical repeater.

A mobile carrier providing mobile communication service may manufacture and manage an analog optical repeater to be allocated with frequencies of a number of bands and service multi-band frequencies. Further, with the development of mobile communication technologies to increase data rates, mobile carriers can improve data transmission rates, for example, through multi-band and multiple-input multiple-output (MIMO) technologies.

FIG. 2 illustrates an example of an analog optical repeater system to service multi-band MIMO according to related art.

As briefly shown in FIG. 2, in general, an analog optical repeater 100 to support multi-band MIMO mobile communication service includes an HE 110 configured to adopt multi-band MIMO, an RU1 140, an RU2 150, an optical cable 120 connecting the HE 110 and the RU1 140, and an optical cable 130 connecting the HE 110 and the RU2 150.

The HE 110 may receive, from a base station 200, signals having frequencies of different bands, for example, a band 1, a band 2, a band 3, a band 1', a band 2', and a band 3', the bands 1 through 3 corresponding to the same frequency bands as the bands 1' through 3', respectively. Since, for example, the band 1 and the band 1' correspond to the same frequency band, the HE 110 includes two optical modules to respectively transmit two signals separately to the RU1 140 and the RU2 150, thereby transmitting upstream and/or downstream signals through the two optical cables 120 and 130.

In this example, a size and a price of the HE 110 and a cost for additionally laying optical cables will all generally be increased.

SUMMARY

According to embodiments of the invention, an analog optical repeater, for example, an analog optical distribute repeater, includes a head end (HE) and a remote unit (RU), and utilizes a single optical line transmission with respect to multi-band MIMO of an analog optical repeater system.

In detail, with the development of mobile communication technology, various frequencies, for example, 3G, 3.5G, and 4G (LTE), are used for mobile communications. As rate increasing technology is developed, associated technologies to adopt such rate increasing technology are also being developed for relay systems, for example, to increase efficiencies.

Generally, to adopt multiple-input multiple-output (MIMO), which is a method of improving a data transmission rates in mobile communication technology, an optical line is added between the HE 110 and the RU 140, for example, as shown in FIG. 2. However, as noted above, the price of the devices and the cost of equipment all increase with such changes.

An aspect of the invention provides a method to overcome a limitation of frequency conversion, which is one way to overcome such issues.

According to example embodiments of the invention, an analog optical repeater including a head end (HE) and a remote unit (RU) may be designed at lower costs by converting and inversely converting a single frequency in the same two frequency bands, to prevent overlapping between the same frequencies, during a process of transmitting multiple-input multiple-output (MIMO) downstream/upstream band signals with respect to the same multi-band frequencies, from the HE to the RU, through a single optical line. By utilizing a single line of optical cable, costs can be reduced.

According to example embodiments of the invention, there is no need to consider a situation, for example, where an optical module is a restriction to a method of reducing optical lines through frequency conversion. A bandwidth of an optical module used for single-input single-output (SISO) is at least doubled for MIMO, and more in cases where multiple bands are used, which causes an increase in a number of components of the optical module, and difficulties in manufacturing the optical module. Thus, by converting an upstream frequency signal into a downstream frequency signal, and converting a downstream frequency signal into an upstream frequency signal, with respect to a band that is subject to frequency conversion, an effect that is similar to using a module with a single input may be achieved.

BRIEF DESCRIPTION OF THE DRAWINGS

These and/or other aspects, features, and advantages of the disclosure will become apparent and more readily appreciated from the following description of example embodiments, taken in conjunction with the accompanying drawings, of which:

FIG. 5A shows a head end and FIG. 5B shows a remote unit; and FIGS. 6A and 6B are diagrams illustrating in detail processing of upstream and/or downstream frequency-converted signals according to an example embodiment, where FIG. 6A shows a head end and FIG. 6B shows a remote unit.

DETAILED DESCRIPTION

An analog optical repeater, for example, an analog optical distribute repeater, according to embodiments of the invention, can be used as a transmitting apparatus for relaying downstream and upstream signals between a base station and one or more terminals. These analog optical repeaters can be used to service shadow areas and other areas in buildings with low coverage, using frequencies allocated to a plurality of mobile communication providers. The analog optical repeaters can employ methods that adopt multiple-input multiple-output (MIMO) using the same frequency band, and can adopt a plurality of frequency bands using a single optical distribute device.

With the development of mobile communication technologies where data rates are increasing, mobile communication providers have to increase data transmission rates, for example, through MIMO, where signal separation technology for separately transmitting signals of the same band can be utilized. While such can be realized easily in digital signal processing systems, realizing the same with analog systems is more difficult and expensive, for example, where a separate optical line and a separate optical wavelength are added to separate signals of the same band.

Meanwhile, according to example embodiments of the invention, a head end (HE) of an analog optical repeater can convert a frequency of a single frequency band through a frequency converter, to prevent signal overlapping in a MIMO system with the same frequencies used in a downstream multi-band, and can utilize a band that is already used by an optical module, so that additional bands in the optical module do not need to be secured. In this manner, signals with the same or similar frequencies input into the HE in a particular period can both be transmitted through the optical cable to a remote unit (RU) without overlapping. The optical signals that are transmitted to the RU through the optical cable can then be converted into RF signals, and the signals can be inversely converted and restored to their original frequencies. A flow and handling of upstream signals input from the RU or terminal end can also be transmitted to the HE in a similar manner as the downstream signals are handled, whereby multi-band MIMO is implemented.

Figure 1:
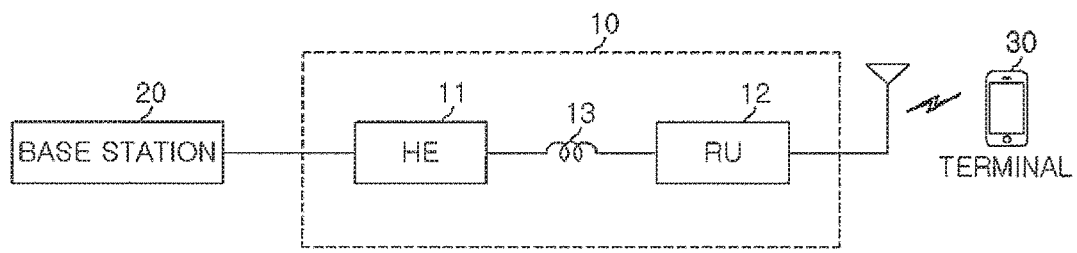
FIG. 1 is a diagram illustrating a general system structure of an analog optical repeater.
Figure 2:
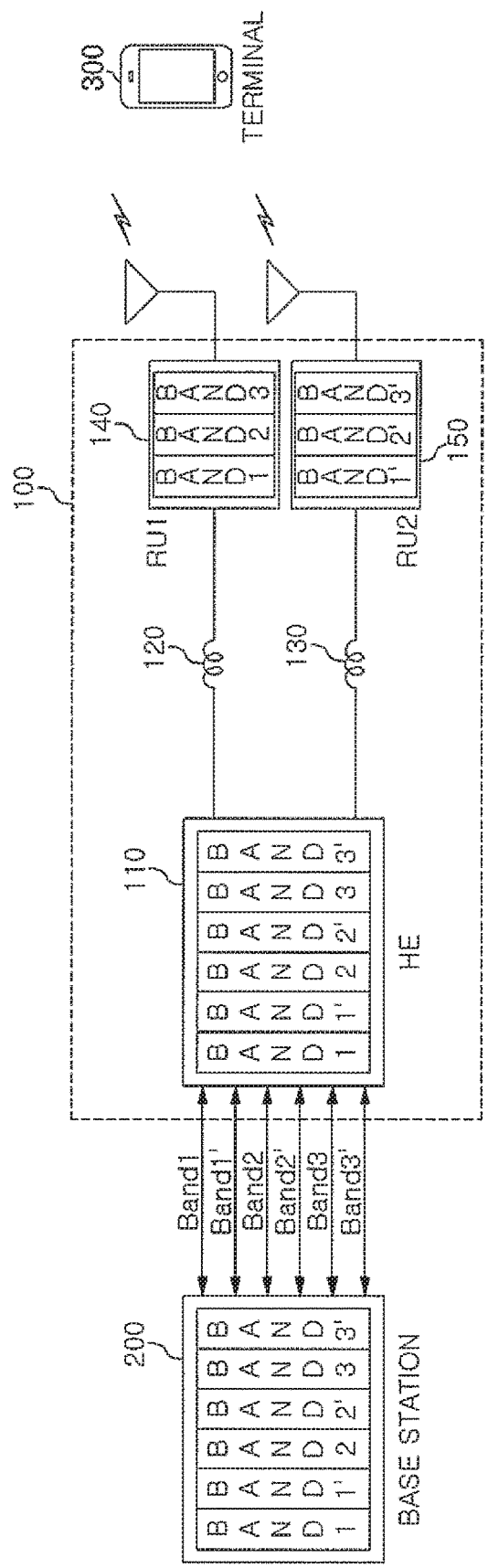
FIG. 2 illustrates a structure of a general analog optical repeater including multiple lines to adopt multi-band multiple-input multiple-output (MIMO)
Figure 3:
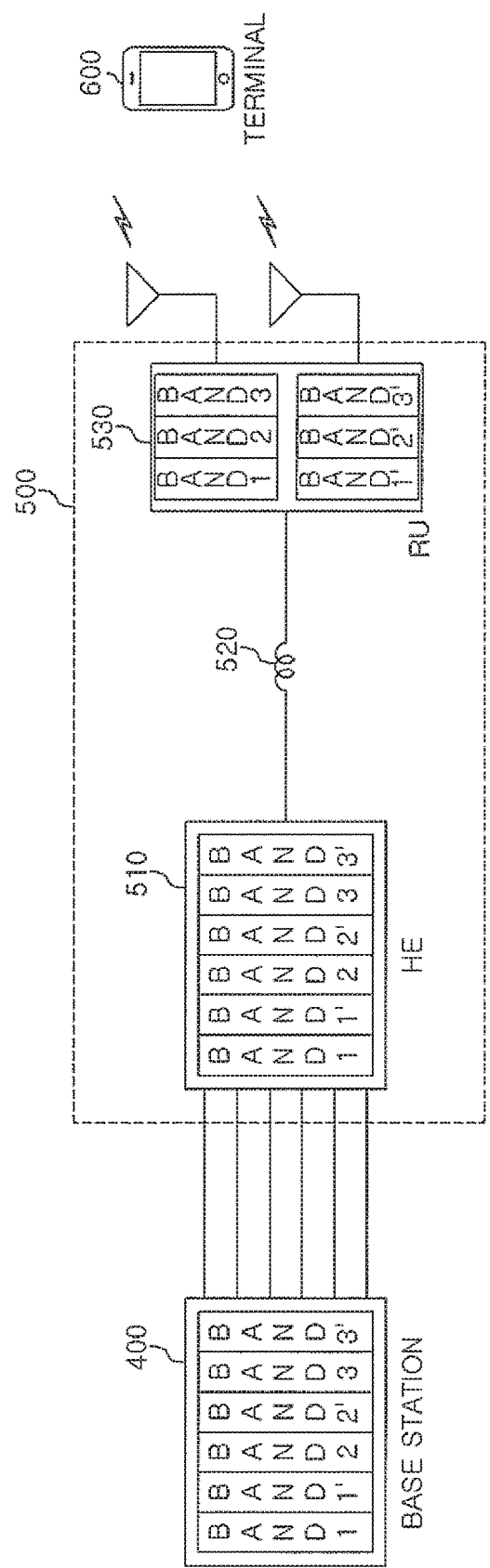
FIG. 3 illustrates a configuration of an analog optical repeater capable of performing a method of transmitting multi-band MIMO signals using a single optical line according to an example embodiment.

FIG. 3 illustrates an example of an analog optical repeater which utilizes multi-band MIMO signals. The repeater 500 an HE 510 and an RU 530 that are connected via a single optical line 520. The repeater 500 can transmit downstream signals from a base station 400 to a terminal 600, and/or can transmit upstream signals from the terminal 600 back to the base station 400. The repeater 500 can utilize, for example, three frequency bands, where each band can support two signals at the same time (e.g., by separately utilizing band 1 and band 1', or more generally, band n and band n'). Meanwhile, other repeater embodiments can be configured to support more or less than three bands, and can support a different number of signals at each band at the same time, depending on the design and configuration of each individual repeater.

Figure 4:
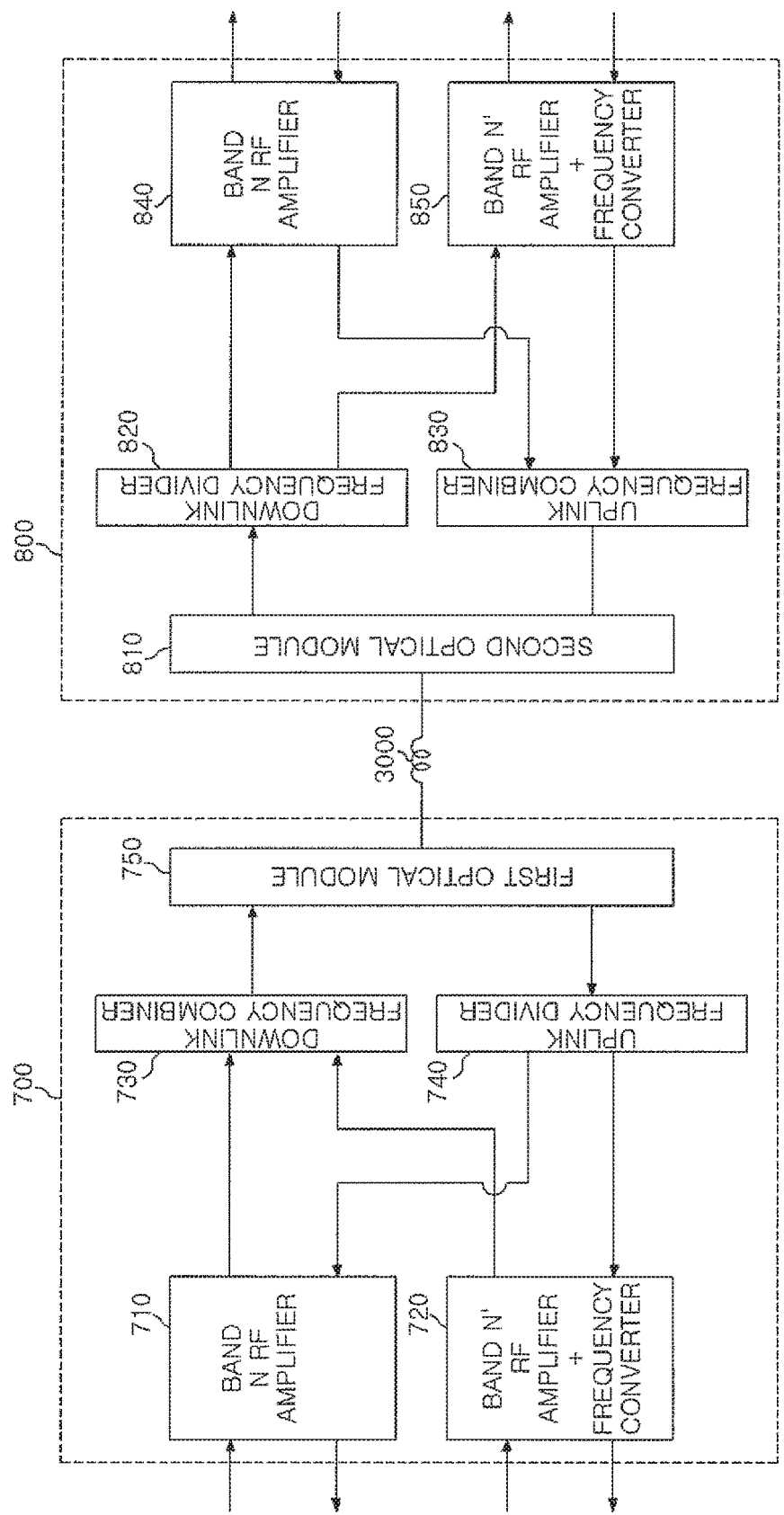
FIG. 4 is a diagram illustrating in detail a configuration of an analog optical repeater according to an example embodiment.

FIG. 4 illustrates in greater detail a portion of an HE and an RU according to an embodiment of the invention, where signals at a band n and at a band n' can be respectively transmitted. Referring to FIG. 4, to transmit respective signals or data having a band n and a band n' at the same frequencies from an HE 700 through an optical line, for example, using a single wavelength, a frequency conversion method converts frequencies of a band n' using a radio frequency (RF) amplifier and frequency converter 720 into predetermined or set frequencies, for example frequencies outside the band n and the band n'. The HE 700 then combines the frequency-converted band n' with a band n, for example, from an RF amplifier 710, through a downlink frequency combiner 730, converts the resulting combined band into an optical signal through a first optical module 750, and then transmits the optical signal to an RU 800 through a single optical cable 3000.

The RU 800 converts the received optical signal into an RF signal through a second optical module 810, divides the RF signal and sends the divided RF signals to a band n amplifier 840 and a band n' amplifier 850, respectively, through a downlink frequency divider 820. The RU 800 then converts the signal whose frequency was converted by the band n' RF amplifier and frequency converter 720 at the HE 700 back to the original frequency of the downstream signal that was input into the HE 700 through an inverse conversion. In this manner, overlapping of frequencies of the band n and the band n' can be prevented, and two signals using the same frequency band can be transmitted via a single optical line.

An upstream signal can be similarly processed through a reverse process of that used and discussed with respect to the downstream signal.

In the frequency conversion method described above, in a case in which multi-band frequencies are input, and frequencies of a band subject to frequency conversion are to be converted into predetermined or set frequencies, non-overlapping bands need to be selected based on the characteristics of the particular optical modules.

Hence, such optical module devices may become more expensive to build, which consequently increases prices of optical modules and decreases overall productivity. In particular, recently, service bandwidths have been increasing to improve data transmission rates, and thus, additional bands for optical modules need to be secured. Such issues further increase the difficulty in executing a frequency conversion method similar to the one described above.

According to another aspect of example embodiments of the invention, there can be provided, for a downlink side, a frequency converter 720 added for each of bands 1' through n', which are multi-band MIMO signals transmitted to the HE 700, and which are configured to perform frequency conversion to prevent overlapping of frequencies between the bands 1' through n', respectively, with frequencies of bands 1 through n, and a downlink frequency combiner 730 configured to combine different frequencies of the band 1 and the band 1', the band n and the band n', etc.

Further, there is also provided a first optical module 750 configured to convert the combined signal into an optical signal. The two combined frequencies are connected to and can be transmitted through the single optical cable 3000. The RU 800 converts the received optical signal into an RF signal through the second optical module 810, divides the converted signal into a band n and a band n' with the downlink frequency divider 820, and sends the divided signals respectively to the band n amplifier 840 and the band n' amplifier 850. The band n amplifier 840 and the band n' amplifier 850 may each further include a band-pass filter (BPF) suitable for a corresponding frequency, for example, to separate a frequency-converted signal and a frequency-unconverted signal from the HE 700. The band n' amplifier and frequency converter 850 is configured to restore the original signal at the band n' by inversely converting the frequency of the signal which is output from the band n' amplifier 720 of the HE 700.

In addition, for an uplink side, the RF amplifier and frequency converter 850 provided is also configured to perform frequency conversion for uplink signals, to prevent overlapping between frequencies of the bands 1' through n', which are multi-band MIMO signals input into the RU 800, with frequencies of the bands 1 through n, respectively. In addition, an uplink frequency combiner 830 is provided and configured to combine different uplink signals, for example, signals input into the RU 800 with frequencies of the band n and the band n'.

Further, the second optical module 810 provided is also configured to convert a combined RF signal into an optical signal. The combined signal is connected to and transmitted through the single optical cable 3000. The HE 700 converts the received uplink optical signal into an RF signal through the first optical module 750, divides the converted signal to a band n and a band n' with an uplink frequency divider 740, and then sends the divided signals to the band n amplifier 710 and the band n' amplifier and frequency converter 720, respectively. The band n amplifier 710 and the band n' amplifier 720 can each include a BPF, suitable for a corresponding frequency, to separate a frequency-converted signal and a frequency-unconverted signal. The band n' amplifier and frequency converter 720 is also configured to restore the original signal at the band n' by inversely converting the signal that was converted and output by the band n' amplifier 850 of the RU 800.

Figure 5A:
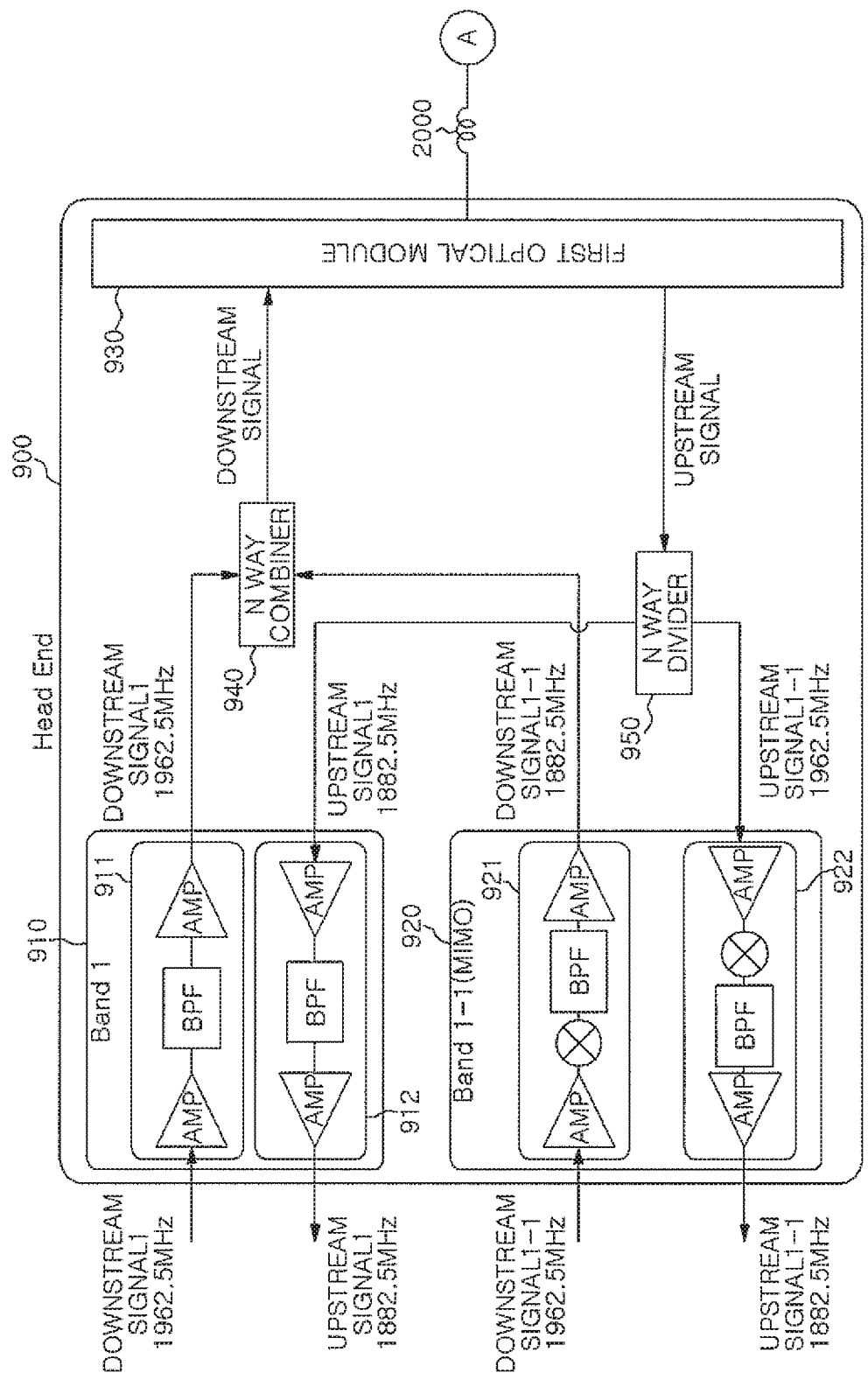
FIGS. 5A and 5B are diagrams illustrating processing of upstream and/or downstream frequency-converted signals, according to an example embodiment, where
Figure 5B:
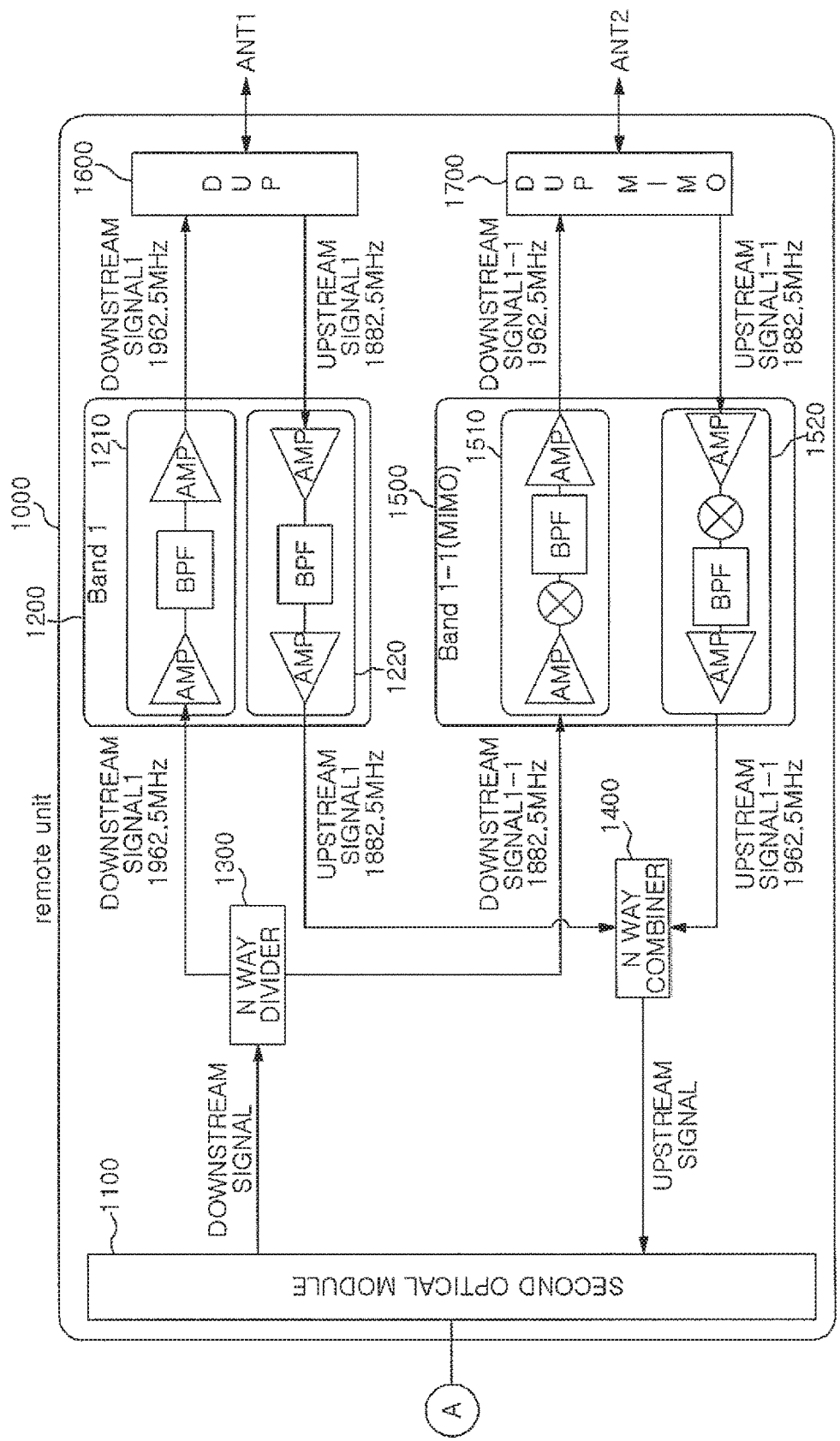

FIGS. 5A and 5B illustrate in detail a configuration of an analog optical repeater according to an example embodiment.

A multi-band multiple-input multiple-output (MIMO) analog optical repeater according to the example embodiment of FIGS. 5A and 5B includes a head end (HE) 900 and a remote unit (RU) 1000.

The HE 900 includes at least one upstream/downstream signal amplifier 910, and at least one other upstream/downstream signal amplifier 920 that also includes a frequency converter.

The HE 900 further includes an N-way combiner 940 that is configured to input a multi-band MIMO downstream signal into a single downstream signal port of a first optical module 930, and an N-way divider 950 configured to separate a multi-band MIMO upstream signal output from the first optical module 930.

The analog optical repeater illustrated in FIGS. 5A and 5B shows in detail the signal flows of a method of preventing overlapping of signals through frequency conversion, in a case of a multi-band MIMO configuration. In some instances, the discussion of the analog optical repeater in FIGS. 5A and 5B uses specific signal frequencies only as an example, and it is to be understood that in other embodiments of the invention, other frequencies can be used instead of those specifically discussed.

Referring to FIGS. 5A and 5B, a downlink downstream signal 1 at a first downlink frequency is input from a base station and is output through a downstream signal amplifier 911 at the same first downlink frequency as the signal that was input. For example, the first downlink frequency may be 1962.5 megahertz (MHz).

A downstream signal 1-1 at the same first downlink frequency that is input from the base station is converted through a downstream signal amplifier 921 that includes a frequency converter to another frequency, for example, to a frequency that is generally used for an upstream signal. For example, the uplink frequency utilized may be 1882.5 MHz. The two frequency signals are then input through the frequency combiner 940 into a downstream signal port of the first optical module 930 and converted into an optical signal.

Through the aforementioned method, although two signals with the same frequencies are input to the HE 900, the frequencies may still be transmitted through a single optical cable 2000 without overlapping, and thus, there is no need for further considering or modifying the characteristics of the optical module. Meanwhile, in a case where a band is shifted to another predetermined frequency, characteristic of the band needs to be considered, and thus it may difficult to manufacture such hardware.

Referring back to the above example and as shown in FIGS. 5A and 5B, the downstream signal 1 of 1962.5 MHz and the downstream signal 1-1 of 1882.5 MHz that are transmitted through the optical cable 2000, for example, as a combined optical signal, are converted into RF signals through a second optical module 1100 of the RU 1000, and are then transmitted through and divided by a frequency divider 1300 to a band 1 downstream signal amplifier 1210 and a band 1-1 downstream signal amplifier and frequency converter 1510, respectively.

Between the frequencies of the two bands input into the band 1 amplifier 1210, only the downstream signal 1, for example, at 1962.5MHz, is output through an internal band-pass filter (BPF), and the downstream signal 1-1, for example, at 1882.5 MHz, or any remnants thereof, are filtered out through the BPF.

In contrast, between the frequencies of the two bands input into the band 1-1 amplifier 1510, the downstream signal 1-1, for example, at 1882.5 MHz, is frequency-converted, for example, back to a signal at 1962.5 MHz, and output as the downstream signal 1-1 at 1962.5 MHz through an internal BPF. Meanwhile, the downstream signal 1, or any remnants thereof, which were transmitted from the frequency divider 1300 at 1962.5 MHz, are frequency converted to another frequency, and are therefore filtered out through the BPF.

As described above, where two signals are received at a same frequency or frequency band, one of the signals can be frequency-converted to another frequency or frequency band, for example, a signal band that is typically used for upstream signals, and the two signals can then be combined and transmitted through the single line of the optical cable 2000. The signal that is frequency-converted can then be inversely converted back to a signal at the original downstream signal frequency or frequency band, and the two signals can then be respectively serviced and provided to a desired terminal through respective duplexers 1600 and 1700 and their respective antennas ANT1 and ANT2.

Meanwhile in the analog optical repeater of FIGS. 5A and 5B, in the case of transmitting one or more uplink signals, operation of the repeater can be performed reversely or in the opposite direction, in a similar manner.

An upstream signal 1 at a first uplink frequency is input from an antenna, for example, antenna ANT1, received from a terminal, and is output through an upstream signal amplifier 1220 at the same first uplink frequency as the signal that was input. For example, the first uplink frequency may be 1882.5 MHz.

An upstream signal 1-1 at the same first uplink frequency that is input from an antenna, for example, ANT2, received from a terminal, is converted through an upstream signal amplifier 1520 that includes a frequency converter to another frequency, for example, to a frequency that is generally used for a downstream signal. For example, the downlink frequency utilized may be the 1962.5 MHz frequency discussed above with respect to the downstream path. The two frequency signals are then input through a frequency combiner 1400 into an upstream signal port of the second optical module 1100 and converted into an optical signal.

Referring again to the above example, and as shown in FIGS. 5A and 5B, the upstream signal 1 of 1882.5 MHz and the upstream signal 1-1 of 1962.5 MHz that are transmitted through the optical cable 2000, for example, as a combined optical signal, are converted into RF signals through the first optical module 930 of the HE 900, and are then transmitted through and divided by a frequency divider 950 to a band 1 upstream signal amplifier 912 and a band 1-1 upstream signal amplifier and frequency converter 922, respectively.

Between the signals or frequencies of the signals at the two frequency bands input into the band 1 amplifier 912, only the upstream signal 1, for example, at 1882.5 MHz, is output through an internal BPF, and the upstream signal 1-1, for example, at 1962.5 MHz, or any remnants thereof, are filtered out through the BPF.

In contrast, between the signals or frequencies of the signals at the two frequency bands input into the band 1-1 amplifier 921, the upstream signal 1-1, for example, at 1962.5 MHz, is frequency-converted, for example, back to a signal at 1882.5 MHz, and output as the upstream signal 1-1 at 1882.5 MHz through an internal BPF. Meanwhile, the upstream signal 1, or any remnants thereof, which were transmitted from the frequency divider 950 at 1882.5 MHz, are frequency converted to another frequency, and are therefore filtered out through the BPF.

As described above, where two signals are received at a same frequency or frequency band, one of the signals can be frequency-converted to another frequency or frequency band, for example, a signal band that is typically used for downstream signals, and the two signals can then be combined and transmitted through the single line of the optical cable 2000. The signal that is frequency-converted can then be inversely converted back to a signal at the original upstream signal frequency or frequency band, and the two signals can then be respectively transmitted to one or more respective base stations.

Figure 6A:
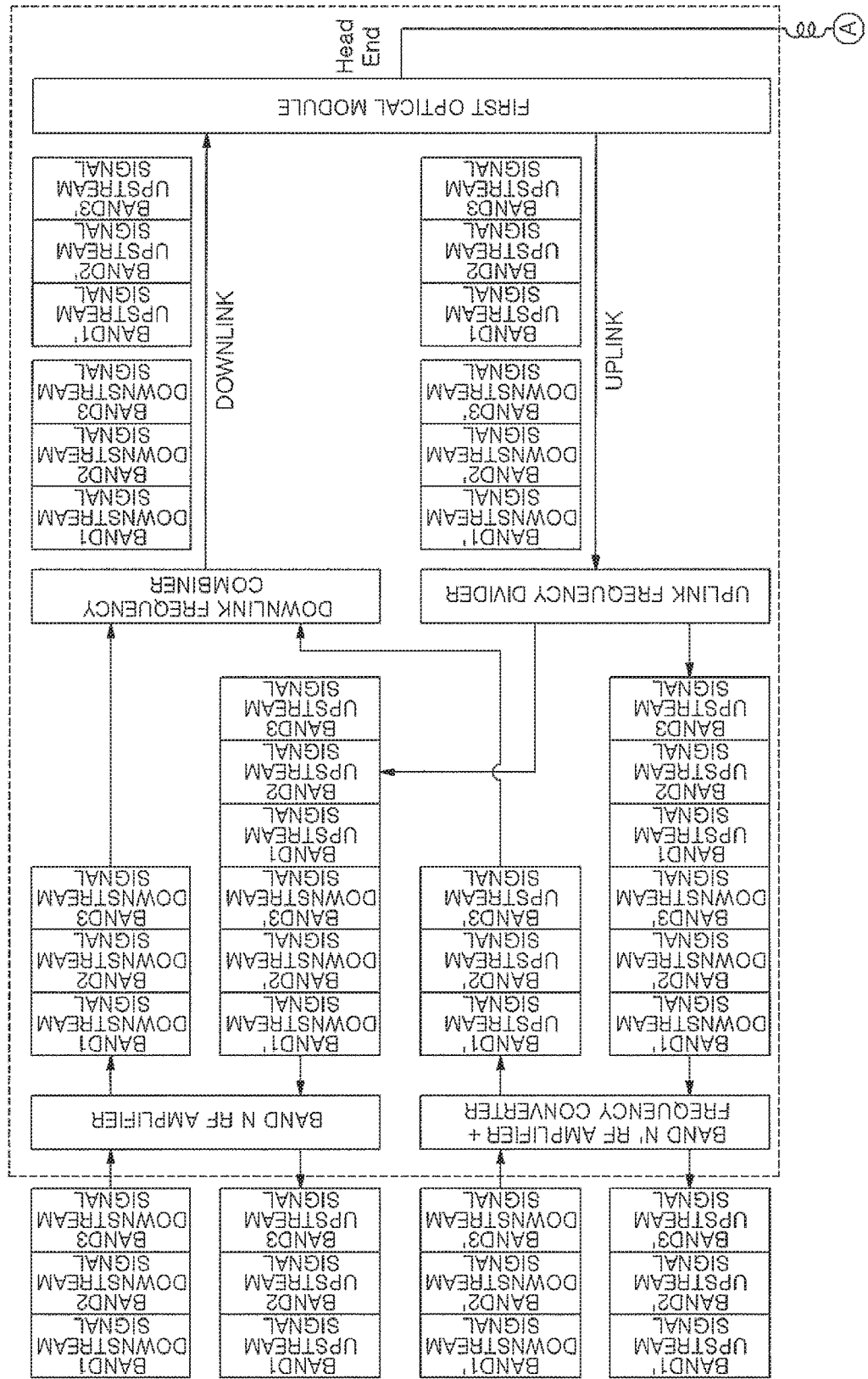

FIGS. 6A and 6B are portions of a diagram illustrating signal flow and downlink/uplink frequency conversion of an analog optical repeater with respect to a multi-band MIMO configuration. The signals that are transmitted and reflected in the analog optical repeater of FIGS. 6A and 6B may be similar to those that are transmitted through the analog optical repeater of FIGS. 5A and 5B.

As shown in the system and signal transmissions illustrated in FIGS. 6A and 6B, multi-band MIMO can be implemented at low cost, without needing to secure additional bands for an optical module, for example, by preventing overlapping between two frequencies in a single optical line. This can be accomplished, for example, through cross conversion of signals from a downlink signal frequency to an uplink signal frequency (e.g., a signal frequency that is typically used for uplink signals), and from an uplink signal frequency to a downlink signal frequency (e.g., a signal frequency that is typically used for downlink signals), respectively. Such an operation can be performed, for example, for frequency conversion of one of two or more signals at one frequency or frequency band, when the signals input are at the same frequency or frequency band, for example, in a case where there are a downlink path and an uplink path separated in a frequency division duplex (FDD), with respect to a mobile communication service band.

In other embodiments, the various features discussed with respect to each embodiment above can be combined in various different ways. In still other embodiments, other modifications may be made, while still implementing the concepts and features discussed above with respect to the various example embodiments. For example, in some embodiments, the frequency converters can utilize, for example, a mixer and an oscillator (e.g., a phase-locked loop), for the frequency conversions.

While the present invention has been described in connection with certain exemplary embodiments, it is to be understood that the invention is not limited to the disclosed embodiments, but is instead intended to cover various modifications and equivalent arrangements included within the spirit and scope of the appended claims, and equivalents thereof.

What is claimed is:

1. A head end (HE) of an analog optical repeater configured to communicate with a base station, and to communicate with a remote unit (RU) connected to the HE through an optical cable and configured to perform wireless communication with a terminal, the HE comprising:
    a first frequency converting amplifier configured to perform amplification and frequency conversion with respect to a downstream multi-band multiple-input multiple output (MIMO);
    a frequency combiner configured to combine the downstream multi-band MIMO;
    a frequency divider configured to divide an upstream multi-band MIMO;
    a second frequency converting amplifier configured to perform amplification and frequency conversion with respect to the upstream multi-band MIMO; and
    an optical module configured to convert the downstream multi-band MIMO from the frequency combiner into a downstream optical signal to transmit to the RU, and to convert an upstream optical signal from the RU into the upstream multi-band MIMO to transmit to the frequency divider;
    wherein the HE is configured to perform frequency conversion to prevent overlapping of signals having the same frequencies when the downstream optical signal is transmitted through the optical cable, and to perform inverse frequency conversion on the upstream optical signal from the RU to prevent overlapping of upstream signals received by the HE with respect to the same MIMO.

2. The HE of claim 1, further comprising a downlink frequency converter configured to convert a signal at a downlink frequency to a converted signal at an uplink frequency, and to filter a band to be used through a band-passer filter (BPF), wherein when two signals at the same downlink frequency are input to the HE, a frequency of a first one of the signals is converted to a signal at the uplink frequency through the frequency converter, while the other signal is transmitted without frequency conversion, to prevent the two signals from overlapping.

3. The HE of claim 2, wherein the downlink frequency converter comprises a mixer and an oscillator for converting the signal at the downlink frequency to the signal at the uplink frequency.

4. The HE of claim 2, wherein the downlink frequency is 1962.5 megahertz (MHz), and the uplink frequency is 1882.5 MHz.

5. The HE of claim 1, further wherein the frequency combiner is configured to combine frequencies corresponding to a multi-band input from the base station, and the frequency divider is configured to divide a combined signal received from the RU corresponding to a multi-band input from the terminal into corresponding frequency bands at the HE.

6. The HE of claim 1, wherein the downstream multi-band MIMO is an RF signal to be converted by the optical module into the downstream optical signal for transmission to the RU through the optical cable, and the upstream optical signal from the RU is to be converted by the optical module into an RF signal corresponding to the upstream multi-band MIMO.

7. The HE of claim 1, further comprising an uplink frequency converter configured to convert a signal at the downlink frequency to a converted signal at the uplink frequency and to filter a band to be used through a band-pass filter (BPF);

wherein when two signals at the same uplink frequency are input to the RU of the analog optical repeater, a frequency of a first one of the signals is converted to a signal at the downlink frequency through the frequency converter, while the other signal is transmitted without frequency conversion, to prevent the two signals from overlapping; and wherein when the HE receives the two signals, the HE converts the frequency of the first signal from the downlink frequency to the first signal at the uplink frequency, and transmits the first signal and the other signal both at the uplink frequency to the base station.

8. The HE of claim 7, wherein the uplink frequency converter comprises a mixer and an oscillator for converting the signal at the downlink frequency to the signal at the uplink frequency.

9. The HE of claim 7, wherein the downlink frequency is 1962.5 megahertz (MHz), and the uplink frequency is 1882.5 MHz.

10. A remote unit (RU) of an analog optical repeater configured to communicate with a base station, wherein the RU is connected to a head end (HE) of the analog optical repeater through an optical cable and is configured to perform wireless communication with a terminal, the RU comprising:

a first frequency converting amplifier configured to perform amplification and frequency conversion with respect to a downstream multi-band multiple-input multiple output (MIMO);

a frequency divider configured to divide the downstream multi-band MIMO;

a frequency combiner configured to combine an upstream multi-band MIMO;

a second frequency converting amplifier configured to perform amplification and frequency conversion with respect to the upstream multi-band MIMO; and an optical module configured to convert the upstream multi-band MIMO from the frequency combiner into an upstream optical signal to transmit to the HE, and to convert a downstream optical signal from the HE into the downstream multi-band MIMO to transmit to the frequency divider;

wherein the RU is configured to perform frequency conversion to prevent overlapping of signals having the same frequencies when the upstream optical signal is transmitted through the optical cable, and to perform inverse frequency conversion on the downstream optical signal from the HE to prevent overlapping of downstream signals received by the RU with respect to the same MIMO.

11. The RU of claim 10, further comprising a downlink frequency converter configured to inversely convert a signal converted at the HE to an uplink frequency back to a signal at a downlink frequency, and to filter a band to be used through a band-pass filter (BPF), wherein, when the RU receives a first signal at the downlink frequency and a second signal at the uplink frequency from the HE, the RU is configured to inversely convert the second signal from the uplink frequency to a signal at the downlink frequency of through the frequency converter, while the first signal is transmitted without frequency conversion.

12. The RU of claim 11, wherein the downlink frequency converter comprises a mixer and an oscillator for converting the second signal from the uplink frequency to the downlink frequency.

13. The RU of claim 11, wherein the downlink frequency is 1962.5 megahertz (MHz), and the uplink frequency is 1882.5 MHz.

14. The RU of claim 10, wherein the frequency divider is configured to divide a combined signal into corresponding frequency bands corresponding to the multi-band input from the HE, and the frequency combiner is configured to combine a signal at an uplink frequency of a multi-band input from the terminal with a frequency-converted signal.

15. The RU of claim 10, wherein the downstream optical signal from the HE is to be converted by the optical module into an RF signal corresponding to the downstream multi-band MIMO and the upstream multi-band MIMO is an RF signal to be converted by the optical module into the upstream optical signal for transmission to the HE through the optical cable.

16. The RU of claim 10, further comprising an uplink frequency converter configured to convert a signal at an uplink frequency to a converted signal at a downlink frequency, and to filter a band to be used through a band-pass filter (BPF), wherein when two signals at the same uplink frequency are input to the HE, a frequency of a first one of the signals is converted to a signal at the downlink frequency through the frequency converter, while the other signal is transmitted without frequency conversion, to prevent the two signals from overlapping.

17. The RU of claim 16, wherein the uplink frequency converter comprises a mixer and an oscillator for converting the signal at the uplink frequency to the signal at the downlink frequency.

18. The RU of claim 16, wherein the downlink frequency is 1962.5 megahertz (MHz), and the uplink frequency is 1882.5 MHz.

* * * * *

UNITED STATES PATENT AND TRADEMARK OFFICE
CERTIFICATE OF CORRECTION

PATENT NO.       : 10,084,543 B2
APPLICATION NO.  : 15/395280
DATED            : September 25, 2018
INVENTOR(S)      : Jung-Hee Won Page 1 of 1

It is certified that error appears in the above-identified patent and that said Letters Patent is hereby corrected as shown below:

In the Claims

| | |
|---|---|
| Column 9, Line 5, Claim 2 | delete "passer" and insert -- pass -- |
| Column 9, Line 18, Claim 5 | before "wherein" delete "further" |
| Column 10, Line 5, Claim 10 | delete "MIMO;and" and insert -- MIMO; and -- |
| Column 10, Line 25, Claim 11 | delete "wherein," and insert -- wherein -- |
| Column 10, Line 29, Claim 11 | after "frequency" delete "of" |
| Column 10, Line 49, Claim 15 | delete "MIMO" and insert -- MIMO, -- first occurrence |

Signed and Sealed this
Seventh Day of July, 2020

Andrei Iancu
*Director of the United States Patent and Trademark Office*